United States Patent [19]
Mikulecky

[11] Patent Number: 4,688,145
[45] Date of Patent: Aug. 18, 1987

[54] REMOVABLE FUSE ASSEMBLY FOR PAD MOUNTED UNDERGROUND DISTRIBUTION SWITCHGEAR

[75] Inventor: Harvey W. Mikulecky, Oconomowoc, Wis.

[73] Assignee: RTE Corporation, Brookfield, Wis.

[21] Appl. No.: 727,286

[22] Filed: Apr. 25, 1985

[51] Int. Cl.[4] .......................... H02B 1/10; H05K 7/16
[52] U.S. Cl. ............................. 361/349; 200/50 AA; 361/347; 361/391
[58] Field of Search ............. 200/50 R, 50 A, 50 AA; 361/338, 339, 340, 342, 343, 347, 349, 350, 357, 360, 391

[56] References Cited
U.S. PATENT DOCUMENTS

| 1,429,275 | 9/1922 | Burnham | 200/50 A |
| 1,826,370 | 10/1931 | Schwarz et al. | 200/50 A |
| 2,669,624 | 2/1954 | Ferguson | 200/50 A |
| 2,689,293 | 9/1954 | Claybourn | 361/336 |
| 2,795,739 | 6/1957 | Wood | 200/50 AA |
| 3,158,700 | 11/1964 | Packard | 200/50 AA |

FOREIGN PATENT DOCUMENTS
0704296 2/1965 Canada ........................ 200/50 AA Primary Examiner—A. D. Pellinen
Assistant Examiner—Greg Thompson

[57] ABSTRACT

A mounting assembly removably supporting an over current fuse package in an opening in a switchgear enclosure. The fuse package having an entry bushing on one side and an internal bushing on the opposite side adapted to connect to a receptacle in the enclosure. The assembly includes a panel for supporting the fuse package in the opening in the enclosure. Clamps mounted on the enclosure for releaseably locking the panel to the enclosure. A lock assembly includes slide support members mounted on the enclosure, bracket members mounted on the panel, a rod rotatably mounted in the bracket members. The rod having a key mounted on each end which is operatively positioned in the slide support members and a bail connected to the rod moving the keys between a locked and an unlocked position with respect to the support members. The bail being inoperable until a cable connector is removed from the entry bushing.

8 Claims, 7 Drawing Figures

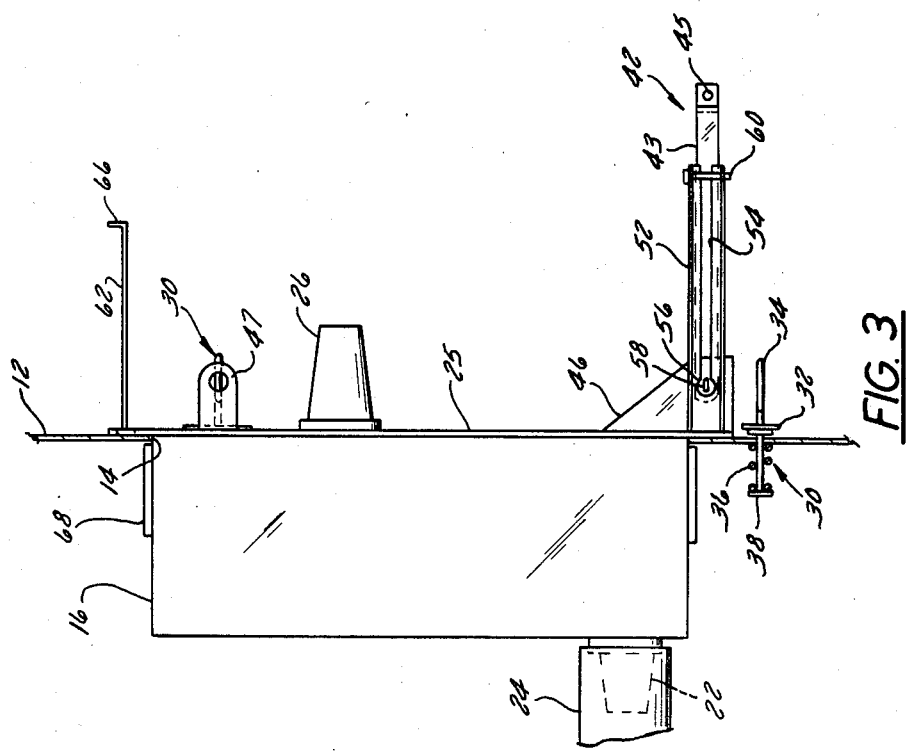
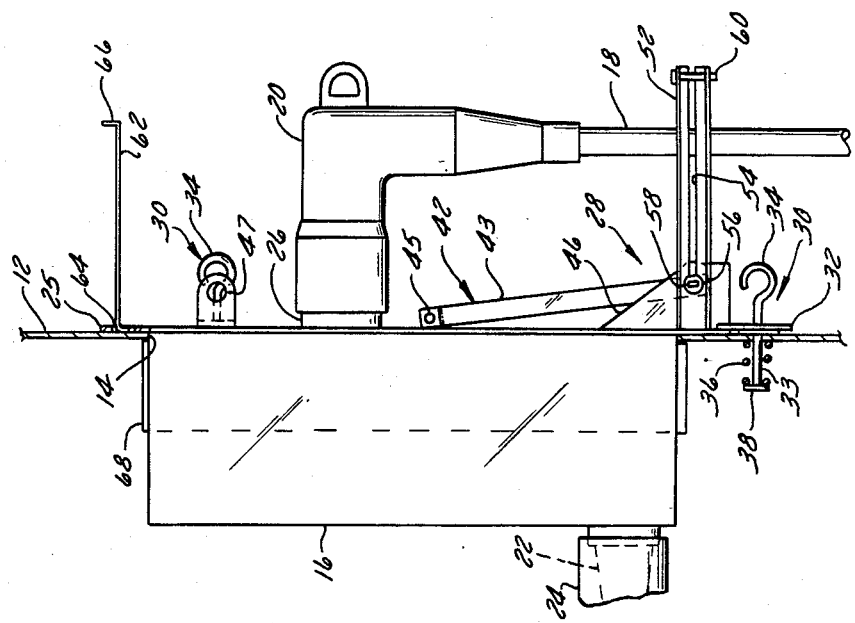

4,688,145

REMOVABLE FUSE ASSEMBLY FOR PAD MOUNTED UNDERGROUND DISTRIBUTION SWITCHGEAR

BACKGROUND OF THE INVENTION

Metal enclosed switchgear of the type contemplated herein generally includes an inaccessable area which contains the live electrical parts of the apparatus and accessible areas which contain electrical connectors or the like. The accessible areas are generally of the dead front type wherein all the exposed surfaces are at ground potential. In those instances where it is necessary to gain access to the inaccessable area of the switchgear, where the live parts are housed, denergization of the device must be achieved before entering the live area. This is of particular significance when high voltage fuses which are housed within the inaccessable area must be removed or repaired as the result of a fault condition. It is therefore one of the primary objects of this invention to provide a device wherein removal of the protector package can be achieved and at the same time intentional or unintentional ingress into the enclosure is prevented.

SUMMARY OF THE INVENTION

The present invention is concerned with an overcurrent protector package which may include current limiting fuse, vacuum fuse or an SF6 overcurrent interruptor which can be removed from the live section of the switchgear without exposing the lineman to the live area of the switchgear. The protector package is of the type which provides electrical communication between a live receptacle within the enclosure and the loadbreak elbow which is connected to the high voltage cable. One of the features of this invention is the inclusion of a release mechanism which cannot be actuated until the loadbreak elbow has been removed from the bushing on the protector package to provide a visible break to the lineman. Once the load break elbow has been removed, the release mechanism can be actuated. After the package has been released from the enlcosure wall, the release mechanism is then rotated to a position where the protector package can be pulled straight out of the enclosure thus disconnecting the package from the live receptacle within the enclosure and at the same time blocking ingress through the opening to the live area of the enclosure. Once the package has reached its outer limit of movement, the opening in the enclosure is closed and the package then pivoted to a repair or replacement position. All of these steps are accomplished with the enclosure opening blocked or closed either by the package or by the doors.

BRIEF DESCRIPTION OF THE DRAWINGS

FIG. 2 is a side elevation view of the overcurrent protector package shown mounted in the normal operating position within a switchgear enclosure.

FIG. 3 is a side elevation view showing the load break elbow removed from the protector package and the interlock arm rotated to the release position.

DETAILED DESCRIPTION OF INVENTION

Figure 1:
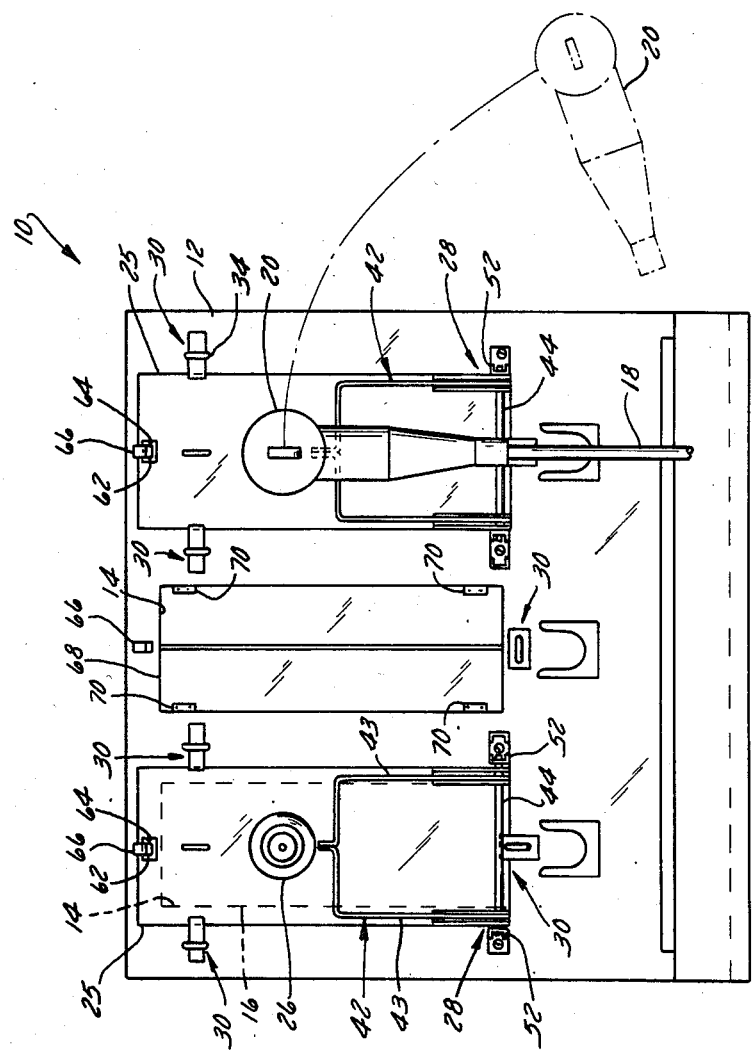
FIG. 1 is a front elevation view of a portion of a connector wall showing the positioning of the electrical connectors used for a three phase switchgear enclosure.

Electrical switchgear of the type contemplated herein as seen in FIG. 1 generally includes an enclosure 10 having a "deadfront" internal connector barrier or wall 12. A number of openings 14 are provided in the wall 12 to allow access to the interior or "live" chamber of the enclosure. A protector package 16 can be mounted in each of the openings 14 to provide electrical communication between switchgear in the "live" chamber of the enclosure and a loadbreak elbow 20 crimped to a high voltage cable 18 which is connected to a power load (not shown). The overcurrent protector package 16 can include a current limiting fuse, a vacuum fuse or an SF6 overcurrent interrupter. The overcurrent protector package 16 generally includes a housing having a first bushing means 22 for connecting the package to a receptacle 24 in the "live" chamber of the enclosure and a second or entry bushing means 26 on the other side which is connected to the loadbreak elbow 20.

The overcurrent packages 16 are supported in the openings 14 by means of panels 25 mounted on the outside of the wall 12. The panels 25 are held against the enclosure wall 12 by means of clamps 30 which include a plate 32 mounted on the shank 33 of a pull ring 34. The plates 32 are biased into engagement with the panels 25 by means of a spring 36 mounted on the shank 33 and positioned between the inside of the wall 12 and a stop member 38 mounted on the end of shank 33.

In accordance with the present invention the overcurrent protector packages 16 are retained within the enclosure by means of an interlock assembly 28 mounted on the front of the wall 12 and panel 25. The assembly 28 is designed to prevent removal of the overcurrent protector package 16 until there is a visible break between the bushing means 26 and the load break elbow 20.

Figure 7:
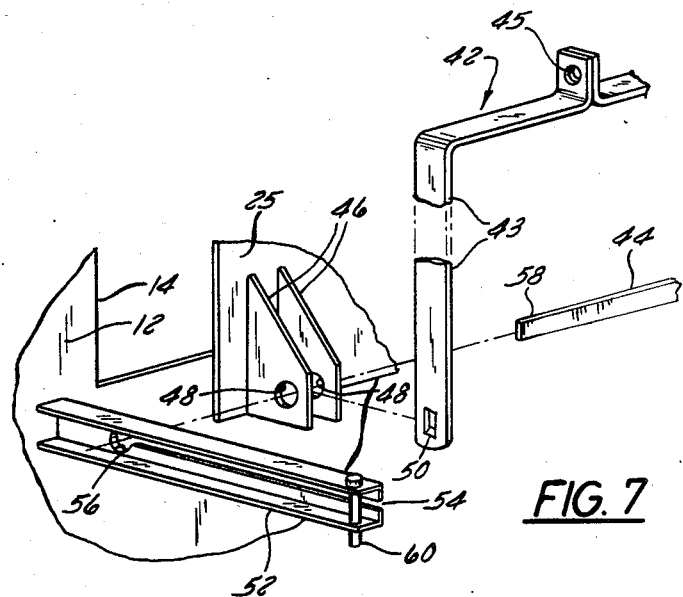
FIG. 7 is an exploded perspective view of the release assembly for the protector package.

Means are provided to prevent removal of the package 16 from the enclosure before the elbow 20 is removed from the bushing means 26. Such means is in the form of the lock assembly 28 provided on the front of the panel 25. In this regard, the assembly 28 (FIG. 7) includes support brackets 46 mounted on the front of panel 25 each having a hole 48 at the lower-outer end of the brackets.

A rod 44 having a rectangular shape forming key 58 at each end is pivotally mounted in the openings 48 in the support brackets 46. Means are provided for rotating the rod in the bracket 46. Such means is in the form of a handle or bail 42 having legs 43 with slotted openings 50 at the ends and an eye 45 in the center of the bail 42. Each of the legs is positioned between a pair of brackets 46 with the rod 44 passing through the openings 50.

Means are provided on the front of wall 12 for pivotally supporting the rod 44. Such means means is in the form of a pair of slide supports 52 mounted on the front of the wall 12. Each support 52 includes a slot 54 which is open at the outer end and terminates at a circular opening 56 at the inner end. The rectangular keys 58 at each end of the rod 44 extend into the openings 56 and are used to selectively lock the rod 44 in the opening 56.

In this regard, it should be noted that the keys 58 having a width greater than the width of slot 54 and a thickness less than the slot 54. The rectangular keys 58 therefore must be rotated to a position where the thickness of the key is in alignment with the slot 54 before the rod can be pulled through the slot 54. As seen in FIG. 2, when the bail 42 is in the vertical or up position, the major dimension or width of the rectangular key 58 will be crosswise to the slot 54. As seen in FIG. 3, when the bail 42 is pivoted outward to the horizontal or down position, the minor dimensions or thickness of the rectangular key 58 will be aligned with the slot 54. Means are provided at the open ends of the slots 54 to prevent the key 58 from sliding out of the slots 54. Such means is in the form of pins 60 located on the end of each of the supports 52.

Means are provided at the top of the packages 16 to maintain or support the packages in a generally vertical position as the rod 44 is pulled through the slots 54 in the slide supports 52. Such means is in the form of an arm 62 which is mounted on the wall 12 and passes through an opening 64 provided in the top of the panel 25. The outward movement of the package is limited by the engagement of the panel 25 with a flange 66 located on the end of the arm 62. By maintaining the package 16 in a vertical relation the internal bushing 22 will be pulled out of the receptacle 24 and access to the "live" chamber though the opening 14 will be blocked until the bushing 22 is disconnected from the receptacle 24.

Means can be provided for closing the opening 14 as the package 16 is moved outwardly on the supports 52 and arm 62. Such means as seen in FIG. 1 is in the form of a pair of doors 68 pivotally mounted on hinges 70 in the openings 14. The doors are biased to the closed position by any convenient means such as coil springs provided on the hinges. The opening 14 in the panel 12 will thereby be closed at all times preventing inadvertent access to the interior of the "live" chamber in the enclosure. Initially the opening is closed by the package 16. As the package 16 reaches the end of the supports 52 and arm 62 the opening is blocked by the doors 68.

The protector package 16 is pivoted outwardly and downwardly for repair or replacement by lifting the panel 25 over the flange 66 using opening 47 for the hookstick. This is achieved by providing sufficient play between the rectangular member 58 and the slot 54 to allow the package to be lifted or raised over the flange 66. If the panel 25 is to be removed for replacement, the pins 60 can be pulled out of the slide support 52 allowing the rod 44 to be pulled away from the end of the support 52.

It should be noted that the packages 16 cannot be pulled from the openings 14 until the loadbreak elbows 20 are removed from the bushing 26. This is accomplished by locating the bail 42 between the panel 25 and the elbow 20. The elbow 20 must be moved to a parking stand before the bail can be moved. A visible break is thus provided between the bushing 26 and the elbow 20 before the package 16 can be pulled outwardly from the opening 14.

Figure 5:
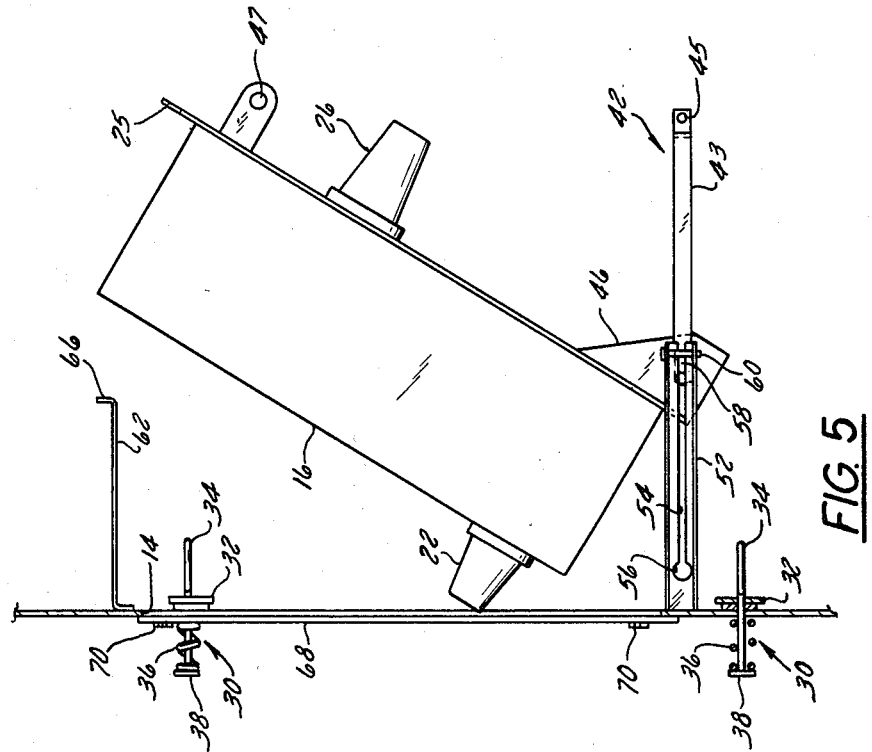
FIG. 5 is a side elevation view of the protector package shown partially pivoted to the repair position.
Figure 4:
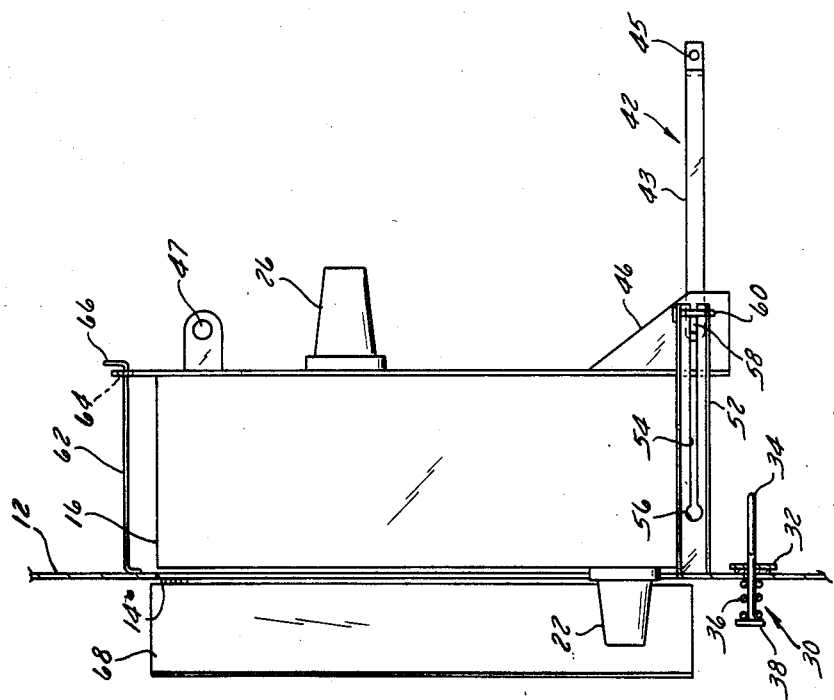
FIG. 4 is a side elevation view showing the protector package pulled outward from the enclosure.
Figure 6:
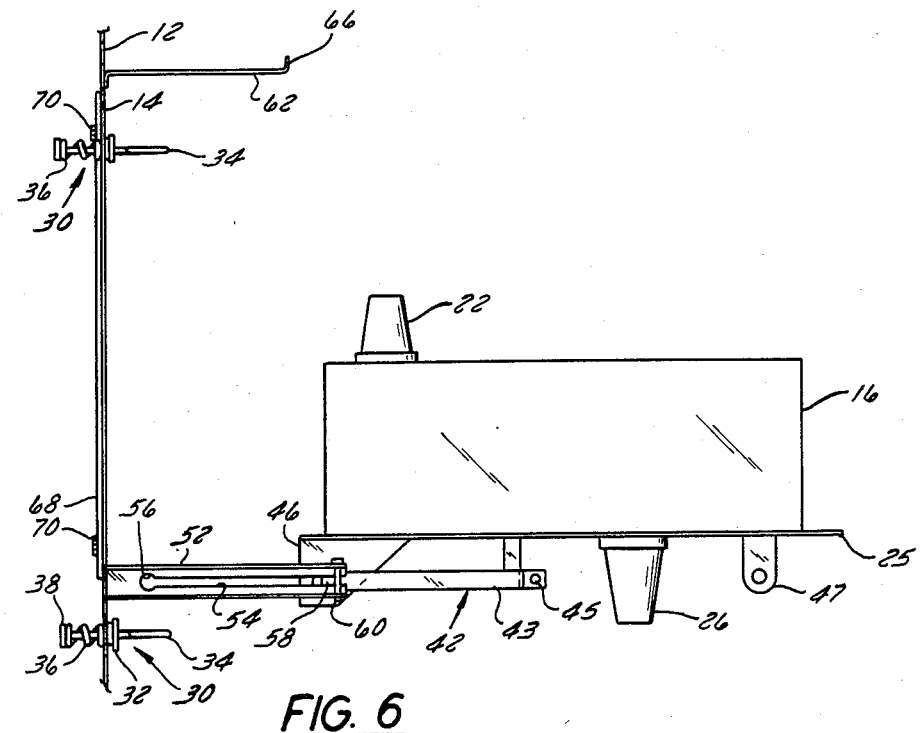
FIG. 6 is a side elevation view showing the protector package in the repair or replacement position.

Once the elbow 20 has been removed from the bushing 26, the clamps 30 are released by inserting a hook stick into the eye 34 to rotate the plates 32 away from the panels 25. The bail can then be pulled outwardly by inserting a hook stick into the opening 45 at the top of the bail 42. When the bail 42 reaches the horizontal position (FIG. 3), the package can be pulled out on the supports 52 and arm 62 to disconnect the bushing 22 from the receptacle 24, (FIG. 4). The package is rotated forward on the rod 44 by inserting the hook stick into the hook eye 47 located on the front of the panel 25, (FIG. 5). Once the package has been moved to the horizontal position (FIG. 6) it can be repaired. If the package is to be replaced, the pins 60 are pulled from the supports 52 and the rod 44 is pulled out of the supports.

I claim:

1. A mounting assembly removably supporting an over current fuse package in an opening in a switchgear enclosure, said fuse package inclusing a housing having an entry bushing on one side which is adapted to be connected to a cable connector and an internal bushing on the other side which is adapted to be connected to a receptacle in the enclosure, the assembly comprising a panel supporting the fuse package in the opening in the enclosure, first means mounted on the enclosure securing the panel against the enclosure, second means selectively locking the panel to the enclosure, said second means including a pair of slide support members mounted on the enclosure, a bracket member mounted on the panel, a rod means rotatably mounted in said brackets and including a key on each end operatively positioned in said slide support members and means moving said rod between a locked position and an unlocked position with respect said support members.

2. The assembly according to claim 1 wherein each of said slide support members include a longitudinal slot having a predetermined width and an opening at one end having a diameter greater than the width of the slot, and said key have a width greater than the width of said slot and a thickness less than the width of said slot.

3. The assembly according to claim 1 or 2 wherein said moving means is located in a position to prevent release of the panel from the enclosure until the cable connector is removed from the entry bushing.

4. The assembly according to claim 2 including an arm mounted on said enclosure for maintaining the package in a vertical position with respect to the slide support members as the package is pulled out of the enclosure.

5. A mounting assembly for a fuse package comprising a panel for supporting said fuse package in an opening in a wall of an enclosure, a slide support member mounted on each side of the opening on the wall of the enclosure said slide support members being mounted on the lower end of said panel and means operatively engaging said slide support members, said means including a rod mounted for pivotal movement on said panel and including a key at each end of said rod, said keys being positioned in said slide support members to support said panel for movement toward and away from said enclosure, said rod being mounted for rotation in said slide support members, whereby said keys are movable between locked and unlocked positions with respect to said slide support members.

6. The assembly according to claim 5 wherein said slide support members include a slot having a predetermined width and a circular opening at one end having a diameter greater than the width of the slot.

7. The assembly according to claim 6 wherein said keys have a major dimension greater than the slot in the slide support members and a minor dimension less than the width of the slot in the slide support members whereby said fuse package cannot be removed from the enclosure until the minor dimension of the keys are aligned with the slots in the slide support members.

8. The assembly according to claim 5 or 6 including a bail mounted on said rod, said bail being pivotal with said rod for movement from a position in front of the panel to a position in alignment with said support members, said bail further including a hook eye whereby said bail can be used to pull the rod through the slots in the slide support members.

* * * * *